US010169739B1

(12) United States Patent
Keiser et al.

(10) Patent No.: US 10,169,739 B1
(45) Date of Patent: Jan. 1, 2019

(54) SYSTEMS AND METHODS FOR REDUCING RECIDIVISM AMONG FORMER INMATES

(75) Inventors: Luke Keiser, Frisco, TX (US); Bruce Cooper, Dallas, TX (US)

(73) Assignee: Securus Technologies, Inc., Carrollton, TX (US)

( * ) Notice: Subject to any disclaimer, the term of this patent is extended or adjusted under 35 U.S.C. 154(b) by 1912 days.

(21) Appl. No.: 11/842,844

(22) Filed: Aug. 21, 2007

Related U.S. Application Data (63) Continuation-in-part of application No. 10/837,799, filed on May 3, 2004, now abandoned.

(51) Int. Cl.
G06Q 10/10 (2012.01)
G06Q 30/08 (2012.01)
G06Q 10/06 (2012.01)

(52) U.S. Cl.
CPC ............... *G06Q 10/105* (2013.01)

(58) Field of Classification Search
CPC .................................................. G06Q 10/105
USPC .................................. 705/1.1–912, 320, 321
See application file for complete search history.

(56) References Cited

U.S. PATENT DOCUMENTS

| | | | |
|---|---|---|---|
| 6,185,316 B1 * | 2/2001 | Buffam | G06F 21/32 382/100 |
| 6,246,751 B1 * | 6/2001 | Bergl | G07C 9/00158 379/114.15 |
| 6,320,974 B1 * | 11/2001 | Glaze | G06K 9/00013 340/5.8 |
| 7,051,086 B2 * | 5/2006 | Rhoads et al. | 709/219 |
| 2003/0050811 A1 | 3/2003 | Freeman et al. | |
| 2004/0064330 A1 | 4/2004 | Keelan et al. | |
| 2004/0186852 A1 | 9/2004 | Rosen | |
| 2005/0055231 A1 | 3/2005 | Lee | |
| 2006/0195326 A1 * | 8/2006 | Okezie et al. | 705/1 |
| 2008/0122613 A1 * | 5/2008 | Sanger | 340/539.11 |

OTHER PUBLICATIONS

Tarpley, et al., "Offender Employment Preparation Program," South Carolina Department of Corrections, 2002-2003 Annual Report.*
Lawrence et al., "The Practice and Promise of Prison Programming," Urban Institute Justice Policy Center—Research Report, May 2002.*
Department of Human Services: Senior & Disabled Services Division, "Trainings available on Work Opportunity Tax Credit (WOTC);" May 15, 2000; 39 pages; Salem, Oregon

* cited by examiner

*Primary Examiner* — Jonathan P Ouellette
(74) *Attorney, Agent, or Firm* — Fogarty LLP (57) ABSTRACT

The present invention provides systems and methods for facilitating the integration of former inmates into society upon release from inmate facilities. A representative embodiment of the present invention allows participating inmates to utilize one or more pre-defined services during their period of incarceration. Utilization of these pre-defined services increases the participant's likelihood of rehabilitation, thus reducing recidivism. Examples of pre-defined services include identification, education, employment, financial, housing, and social connection services. A release package based upon information collected during use of these services also provides a personal dossier that facilitates criminal investigations, parole evaluations, probation determinations, and the like.

48 Claims, 6 Drawing Sheets

SYSTEMS AND METHODS FOR REDUCING RECIDIVISM AMONG FORMER INMATES

CROSS-REFERENCE TO RELATED APPLICATIONS

The present application is a continuation-in-part of co-pending, commonly assigned, U.S. patent application Ser. No. 10/837,799 entitled "System and Method for Managing Employment Positions in Association with Tax Credit Fulfillment," filed May 3, 2004, and it is related to co-pending, and commonly assigned U.S. patent application Ser. No. 10/720,732 entitled "Information Management and Movement System and Method," filed Nov. 24, 2003, Ser. No. 11/038,471 entitled "System and Method for Providing Communication Services and Intervening When Necessary to Provide Service," filed Jan. 19, 2005, Ser. No. 11/125,842 entitled "Processor-Based Self-Service Terminals Used with Respect to Controlled Environment Facilities," filed May 10, 2005, Ser. No. 11/182,625 entitled "Systems and Methods for Acquiring, Accessing, and Analyzing Investigative Information," filed Jul. 15, 2005, Ser. No. 11/480,289 entitled "Systems and Methods for message Delivery in a Controlled Environment Facility," filed Jun. 30, 2006, Ser. No. 11/479,950 entitled "Information Dissemination Systems and Methods for Use in a Controlled Environment Facility," filed Jun. 30, 2006, and Ser. No. 11/750,031 entitled "Systems and Methods for message Delivery in a Controlled Environment Facility," filed May 17, 2007, the disclosures of which are hereby incorporated herein by reference.

TECHNICAL FIELD

The present invention is related to systems and methods for reducing recidivism among former inmates and, more particularly, for facilitating the integration of former inmates into society upon their release from inmate facilities.

BACKGROUND OF THE INVENTION

Recidivism rates for released prisoners in the United States are among the highest in the developed world and cost the government millions of dollars every year. The United States Department of Justice tracked the arrest, conviction, and incarceration of former inmates for three years after their release from prisons in 15 states for the year of 1994. Patrick A. Langan & David J. Levin, *Recidivism of Prisoners Released in* 1994, Bureau of Justice Statistics, NCJ 193427 (June 2002). The report revealed that inmates with the highest "re-arrest" rates were motor vehicle thieves (78.8%), those previously incarcerated for possessing or selling stolen property (77.4%), larcenists (74.6%), burglars (74.0%), robbers (70.2%), and those previously incarcerated for possessing, using, or selling illegal weapons (70.2%). The report also shows that, during the same time period, 2.5% of released rapists were arrested for another rape and 1.2% of those who had served time for homicide were arrested for another homicide.

One factor recognized by the present inventors as contributing to such high recidivism rates is the inmates' inability to secure employment upon release. Various governmental programs have attempted to address the employability of former inmates. An example of a government program intended to assist former inmates in obtaining employment is the Work Opportunity Tax Credit (WOTC) program. The WOTC program provides tax credits for hiring a new employee who is a former inmate and satisfies other relevant criteria. As is common with many government programs, however, the WOTC program involves a relatively cumbersome certification process. Accordingly, relatively few employers find sufficient incentive for the potential tax credit given the effort that must be expended to fulfill the regulatory requirements. This is especially true of employers of relatively smaller numbers of employees that do not possess specialized human resource departments.

Some organizations and professionals assist employers in fulfilling the regulatory requirements associated with obtaining tax credits through the program. These organizations or professionals may obtain information concerning a particular employer, the employees (i.e., former inmates), the employees' expected hire dates, their release dates from inmate institutions, and other pertinent details. Using their expertise, the organization or professional calculates the anticipated tax-credits that would be received upon completing the regulatory requirements. The employer pays a percentage of the anticipated tax-credit up front and the organization or professional then completes the regulatory requirements. These organizations and professionals typically direct their services to relatively large organizations, because the potential revenue associated with obtaining tax-credits for a small number of former inmates is typically not sufficiently attractive to small organizations. Hence, the fees paid for such tax services limits the number of employers that can make use of those services.

Another factor recognized by the present inventors as contributing to recidivism is the lack of education among the general inmate population. Education during incarceration increases the chances that former inmates will become productive members of society. In fact, an increasing number of inmate facilities now offer inmates the opportunity to take General Educational Development (GED) and English as a Second Language (ESL) courses. In addition, some inmate facilities also offer inmates vocational education that helps them develop skills leading to post-release jobs.

Yet another factor recognized by the present inventors as contributing to recidivism is the inmates' lack of proper documentation upon release, generally coupled with their inability to follow the procedures required for obtaining those documents (e.g., birth certificate, social security card, identification card, driver's license, etc.). Other issues also recognized by the present inventors as stumbling blocks on an inmate's road to rehabilitation include a lack of access to financial services, difficulties in making housing arrangements, and insufficient contact with family members and friends during the period of incarceration.

SUMMARY

The present invention provides systems and methods for facilitating the integration of former inmates into society upon release from inmate facilities. Examples of inmate facilities include jails, prisons, penitentiaries, detention centers, and the like. A representative embodiment allows participating inmates ("participants") to utilize one or more pre-defined services during their period of incarceration. Utilization of these pre-defined services increases the participant's likelihood of rehabilitation, thus reducing recidivism.

In one embodiment, a pre-defined service or application facilitates the request and issuance of documentation for participants. Upon release, former inmates may not have copies of basic documents necessary for conducting every day life. For example, an inmate may not have birth certificate, social security card, driver's license, identification card, or the like. Accordingly, different packages of documents may be offered to a particular participant based on his or her anticipated needs (e.g., employment, etc.). Hence, a database may be populated with identification information about the inmate during his or her period of incarceration. The information may then be used to fill out forms necessary for requesting documentation, and those forms may be transmitted to the appropriate government agency. Participants may then be provided with proper documentation upon release.

In another embodiment, a pre-defined service or application provides and/or gathers education information from participants. Education information provided to a participant may include, for instance, a recommendation as to what type of education to pursue while in prison to improve a participant's chances of getting a job upon release. Education information gathered from the participant may include education acquired by the participant prior to, or during the period of, incarceration. For example a database may store all of the training, certifications, degrees, licenses, etc. that the participant has sought or acquired while in prison.

At least a portion of this information may be made available to potential employers seeking to hire former inmates. Further, potential employers may be allowed to contact the participant before release so that the participant may have a job immediately upon re-entry.

In yet another embodiment, a pre-defined service or application provides employment information and assists participants in securing employment. For example, employment information may include availability of jobs, salary information, etc. A database is populated with employment related information by the participants. The participants are provided with employment cards. The employment cards inform potential employers of a professional service that fulfills employment requirements for employers. Furthermore, the employment cards contain information that enables employers to obtain employment information stored in the database.

Some representative embodiments are directed to a process for facilitating the employment of individuals of a population that are eligible for tax-credits. In the process, potential employees enter employment related information into a database. The employment information may include prior employers of the participants, marketable skills, contact information upon release, and/or the like. Other relevant information can be entered into the database such as the completion of various educational and vocational courses.

Individuals participating in the program are provided with cards or other suitable documents. The documents inform potential employers, employment agencies, or any other suitable entity of the tax-credit potential associated with employment of the participants.

The documents provide contact information (e.g., a uniform resource locator (URL), an e-mail address, a telephone number, and/or the like) to a professional service that will assist the employer in obtaining the tax-credits. In return, the employer agrees to share a percentage of obtained tax-credits as consideration for the service of fulfilling the regulatory requirements. The employer may access the database of employment-related data to obtain information relevant to the employer's decision to hire the participant using the contact information, and may also add hiring information and other demographic information (e.g., pay stub, pay history, etc.) to the database during the course of the participant's employment.

In still another embodiment, a pre-defined service or application provides financial information and assists participants in establishing accounts with financial institutions. Financial information provided to a participant may include, for instance, a recommendation as to what types of accounts to open. Moreover, a database may be populated with information that facilitates the opening of checking, savings, brokerage, and/or credit accounts for participants. Additionally, the database may be periodically updated by financial institutions so that participants may receive annual credit reports indicating their financial progress or the like.

In a further embodiment, a pre-defined service or application provides housing information and facilitates housing arrangements for participants. The U.S. Department of Housing and Urban Development (HUD) provides forms that need to be filled out upon release of an offender in order to obtain housing. To facilitate this process, a database according to the present invention may collect information from participants during their incarceration that may be used to fill out necessary forms to aid the participant in finding appropriate housing.

Furthermore, the pre-defined service or application may aid participants in selecting regions or places to live in based upon, for example, the location of job prospects the participant is likely qualified for, the level of criminality of the area, the presence of educational facilities that offer classes which have been determined as likely to help the participant obtain employment, etc.

In yet another embodiment, a pre-defined service or application enables participants to develop and maintain social connections and interactions. Accordingly, a suite of applications may be provided to participants including, for example, secure instant mail, call messaging, etc., which allows participants to maintain contact with the outside world in a controlled and safe manner.

In a preferred embodiment of the present invention, a re-entry or release package incorporates some or all of the identification, education, financial, employment, housing, and social connections services described herein. The release package provides participants, while incarcerated, with the tools necessary for their seamless and immediate integration into society upon release. Moreover, the release package may also serve as a personal dossier to facilitate criminal investigations, parole evaluations, probation determinations, and the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
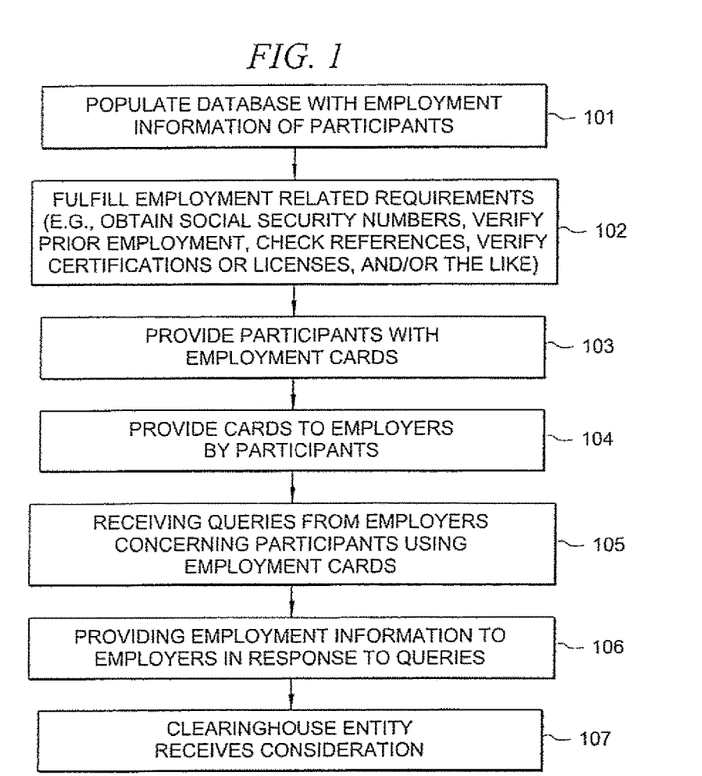
FIG. 1 depicts a flowchart for facilitating the employment of individuals participating in an employment program according to one representative embodiment.

Referring now to the drawings, FIG. 1 depicts a flowchart for facilitating the employment of individuals participating in an employment program. The individuals participating in the program may be any suitable group of individuals desiring employment. In some representative embodiments, the individuals are from a typically underemployed population (e.g., former inmates). Alternatively, the program participants may originate from a particular community or organization (e.g., high school, college, vocational school, professional organization, or other suitable organization).

In step 101 of the flowchart, a database is populated with employment information of the program participants. The employment information may include prior employers of participants, marketable skills, educational backgrounds, professional licenses or certifications, reference information, and/or the like.

In step 102, employment related requirements are fulfilled by a suitable clearinghouse entity. The employment requirements may vary by the participant population and, potentially, by target employers. For ordinary participant populations, the employment related requirements may involve obtaining social security numbers, obtaining legal identification (e.g., driver's licenses), verifying prior employment, checking references, verifying certifications or licenses, obtaining drug tests, and/or the like). For other populations, the fulfillment of employment requirements may include obtaining a regulatory certification that employment of a program participant qualifies an employer for a tax-credit (such as former inmate status). Additional fulfillment activities may be performed after employment of program participants (e.g., in association with obtaining tax-credits) as appropriate.

In step 103, employment cards are provided to program participants. The employment cards may identify the professional service that fulfills the employment related requirements. Also, the employment card may identify a resource associated with the professional service (e.g., a uniform resource locator (URL), an e-mail address, a phone number) to enable potential employers to learn more about the professional service. The employment cards may include an identifier of the particular program participant to obtain employment information of that participant.

In step 104, the program participants provide the employment cards to employers. In step 105, the employers submit queries concerning program participants to the resource identified in the cards. In step 106, the employment information is provided to employers in response to the queries. For example, the employers may access resumes that are autonomously generated by a website using the database. Furthermore, the employers may access documentation of the fulfillment of the employment requirements.

In step 107, the clearinghouse entity that fulfilled the regulatory requirements receives consideration for their activities.

Some representative embodiments may provide a number of advantages. For example, the cost of fulfilling employment requirements can be reduced. Specifically, each employer need not possess its own human resources department. Instead, such functions may be centrally managed through the clearinghouse entity. Thus, the cost of performing the requirements can be more efficiently distributed across numerous employers. The ability to reduce the costs and inconvenience associated with hiring decisions may enable small employers to increase their personnel rolls. Additionally, the reduced cost and increased efficiency of the hiring process may enable employers to hire more temporary employees who otherwise would not be sufficiently profitable to hire. Moreover, centrally managing employee screening procedures through a clearinghouse entity enables uniformity in the hiring process thereby ensuring compliance with legal and other pertinent requirements.

Figure 2:
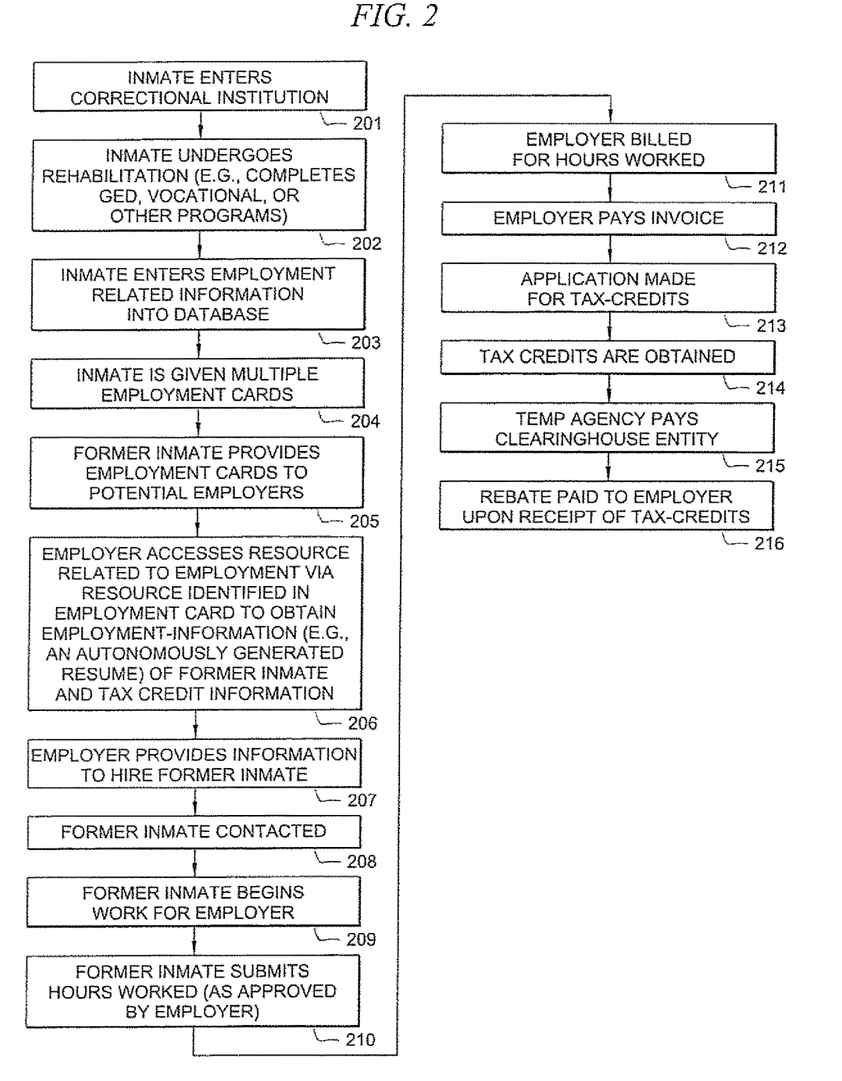
FIG. 2 depicts a flowchart of a process for facilitating employment of former inmates according to one representative embodiment.

Although representative embodiments can be utilized to serve any participant population, some embodiments are specifically directed toward assisting former inmates in securing employment. FIG. 2 depicts a flowchart for facilitating employment of former inmates according to one such representative embodiment. The flowchart of FIG. 2 assumes the use of a temporary employment agency intermediary ("temp agency"). For legal and tax purposes, the temp agency is the employer. However, for the purpose of the flowchart of FIG. 2, the term "employer" shall be used in its colloquial sense as the entity to which the employee directly renders services. Also, although the flowchart of FIG. 2 makes use of a temp agency intermediary, a temp agency is not required by the present invention.

The process begins in step 201 where an inmate enters an inmate institution. In step 202, the inmate undergoes rehabilitation during the inmate's time in the inmate institution. The rehabilitation may include court mandated activities such as chemical dependency programs or life-skill programs. The rehabilitation may include educational programs. For example, many institutions enable inmates to earn their GEDs. Also, some institutions provide inmates the opportunity to obtain associate or other advanced degrees. The rehabilitation process may include various vocational activities. Outside organizations may provide suitable programs to prepare inmates for their subsequent release (such as resume writing programs, interviewing programs, etc.).

In step 203, the inmate (or facility professional) may enter employment-related information into a database during the inmate's time within the inmate institution. The database may also be autonomously populated with data from other systems. For example, the data from criminal history systems may be entered into the database. Also, as the inmate completes various rehabilitation programs, suitable information may be entered into the database by appropriate third-parties. Furthermore, to facilitate the regulatory requirements of the tax-credit program, suitable information may be entered into the database by administrative personnel such as the release dates of inmates, the inmate institution identifiers, and/or the like. If the inmate was incarcerated in an institution that possesses a management system, the records stored in the management system may be downloaded to the database. Information that is typically stored in institution management systems includes the general history of inmates during institutionalization, discipline records, medical history records (including required medications), and/or other pertinent data.

In step 204, upon release from the inmate institution, the inmate is given one or several employment cards, documents, electronic or magnetic media, or the like. Each employment card may contain text informing potential employers of tax-credit potential associated with employment of the former inmate. Also, the employment card may contain information (e.g., a URL, an e-mail address, a phone number) to enable potential employers to learn more about the tax-credit potential and the background of the former inmate. The employment card may include a database key identifying the inmate to perform a database look-up to obtain the background information. Specifically, the employer may access the information entered into the database in step 203 and any other appropriate information.

In step 205, the former inmate provides the employment cards to potential employers.

In step 206, the employer accesses information using the resource identified in the employment card. For example, the potential employer may access a website identified in the employment card. The website may explain the tax-credit potential. Also, the website may explain the services rendered by the temp agency. The temp agency may perform all of the human resource (HR) activities related to the employment of the former inmate. The temp agency may perform tax withholding and reporting activities, benefit management, payroll activities, etc. The website may explain the procedures for hiring the employee on a temporary basis, temporary-to-permanent basis, or a permanent basis. Also, the website may explain an agreement to allocate or distribute the tax-credit savings between the temp agency and the employer. The website may also enable the potential employer to obtain relevant information from the database using the database key of the former inmate printed on the employment card.

For example, an autonomously generated resume may be created. Also, the potential employer may examine the former inmate's criminal history to determine whether employment of the former inmate is appropriate for a particular position. Although a website has been described as providing employment and tax information to employers, other suitable methods may be used to provide such information. For example, a call center employing an interactive voice response (IVR) system and/or live-agents can provide the information if desired.

In step 207, the employer provides information to the temp agency to hire the employee (employment position, start date, hourly wage, etc.).

In step 208, the employee is contacted. For example, an automated call may be generated to inform the former inmate of the employment opportunity. In step 209, the former inmate begins work for the employer. In step 210, the former inmate submits hours worked as approved by the employer. The hours worked are submitted to the temp agency to facilitate payment of the former inmate's wages. Also, the hours worked are submitted to a tax processing system of a tax-credit clearinghouse entity to facilitate the tax-credit process. In step 211, the employer is billed for the hours worked. The invoice may include the expenses directly related to the former inmate's wages and benefits and may include a reasonable surcharge for the temp agency's services. In step 212, the employer pays the invoice.

In step 213, an application is made for the tax-credits using the information stored in the tax processing system by the tax-credit clearinghouse entity. In step 214, the tax-credits are obtained. In step 215, the temp agency receiving the tax-credits pay the tax-credit clearinghouse entity a suitable fee. In step 216, a rebate is paid to the employer according to the contractual terms between the temp agency and the employer.

Although the flowchart of FIG. 2 has described the tax-credit process in conjunction with temporary employment of former inmates, the present invention is not so limited. Tax-credit processing may be facilitated for any type of suitable employment situation (permanent hire, work-release, and/or the like).

Figure 3:
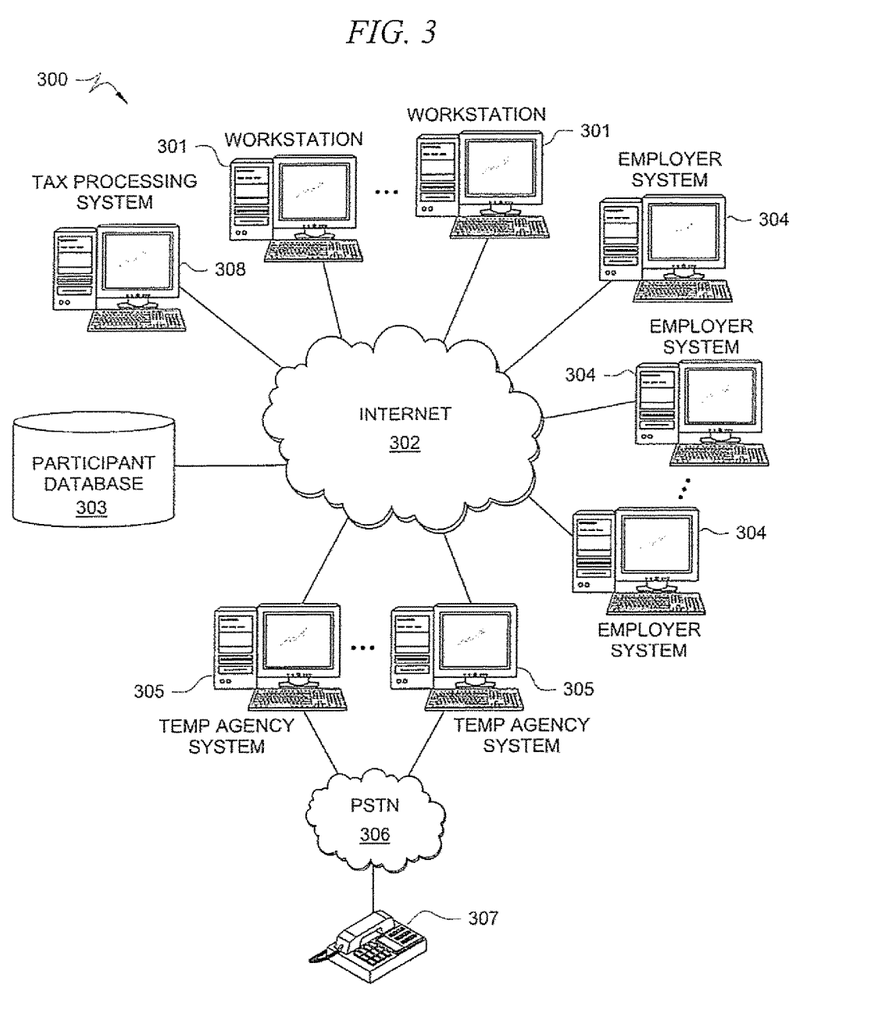
FIG. 3 depicts a system for facilitating the employment of program participants according to one representative embodiment.

FIG. 3 depicts system 300 for facilitating employment of participants (such as former inmates) of an employment program according to one representative embodiment. One or several workstations 301 may be disposed at any number of appropriate locations. For example, workstations 301 may be also located in classrooms of the institutions where educational courses, vocational courses, or other programs are held. Program participants or other suitable personnel may enter employment-related information using workstations 301 and the information is stored in participant database 303 via the Internet 302 or other network.

Employer systems 304 may operate in system 300 in a number of ways. Upon presentation of an employment card, an employer may use employer system 304 to obtain information related to employment candidates and, optionally, potential tax-credits. Also, as the employer becomes familiar with employment of program participants, an employer may use employer system 304 to list job opportunities via temp agency systems 305. Employers could also search for suitable program participants that may become available in the near future (e.g., inmates that will be released in the near future). Upon employment of program participants, temp agency systems 305 may communicate employment information (e.g., hours worked, wages paid, and/or the like) to tax processing system 308. Tax processing system 308 acts as a clearinghouse to facilitate completion of the regulatory requirements associated with obtaining tax-credits for the employment of the program participants. Upon receipt of the tax-credits, suitable information may be communicated between tax processing system 308 and temp agency systems 305.

Furthermore, program participants may use system 300. For example, a program participant using telephone 307 may periodically dial a "1-800" or other number identified on the program participant's employment card to follow employment opportunities. Using a service control point (not shown), the "1-800" call can be directed to a temp agency system 305 that is closest to the locale of the program participant. The temp agency system 305 that receives the call may provide an interactive voice response (IVR) system to interact with the program participants. The IVR application may inform the participant of potential employment positions appropriate for the participant's qualifications as identified in participant database 303. Furthermore, the IVR application may enable the participant to apply for the various positions as desired. If the participant has previously applied for a position and the employer is interested, the IVR application may facilitate scheduling an interview. Furthermore, temp agency system 305 may generate an automated call to a participant when an employer indicates interest in interviewing the participant to facilitate the interviewing process. In alternative embodiments, a website may be used by participants to follow employment opportunities.

System 300 may be used by other appropriate entities. For example, if the program participants are former inmates, parole agency personnel may access system 300 to determine the employment status of former inmates. Furthermore, law enforcement agencies may examine data stored in system 300 to track the activities of former inmates as appropriate for criminal investigations.

Figure 4:
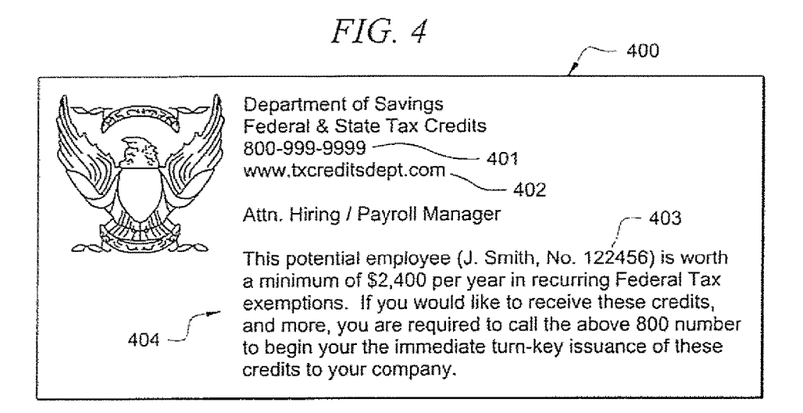
FIG. 4 depicts an employment card according to one representative embodiment.

FIG. 4 depicts employment card 400 according to one representative embodiment. Multiple employment cards 400 may be given to individuals at appropriate times during their participation in the employment program. Each employment card 300 may include text description 404 that informs employers of the tax-credit potential of the respective participant. Furthermore, employment card 400 includes identification of a contact source to enable employers to obtain additional details regarding the available professional services and other employment information related to the participant. Employment card 400 includes "1-800" number 401 that may enable the employer to contact an automated telephony application, a call center, or a specific professional to obtain the relevant information. Also, employment card 400 includes uniform resource locator 402 (or alternatively an e-mail address) for this purpose. Furthermore, employment card 400 may include identifier 403 of the participant. The identifier 403 of the participant may include a database key. Employers may use the database key to obtain information relevant to employment of the participant (e.g., the participant's employment history and relevant skills). For example, an autonomously generated resume may be communicated to employers (via a website, e-mail address, and/or the like). This functionality is advantageous for participants that may not possess sufficient professional experience to create their own resumes in a manner that is convenient for hiring professionals.

Referring back to FIG. 3, system 300 may be used to provide additional services to participants. For example, additional services may facilitate the request of documentation, gathering of educational and medical records, establishment of financial accounts, applications for housing, and maintenance of social connections, as shown in FIGS. 5-8 and discussed below. Program participants or other suitable personnel may access one or more of these pre-defined services using workstations 301. Moreover, information provided by participants may be placed in an electronic, personal inmate dossier that is stored in participant database 303 via Internet 302 or other network.

In one embodiment, at least one or more of workstations 301 may be a processor-based systems such as the one described in the above referenced patent application entitled "Processor-Based Self-Service Terminals Used with Respect to Controlled Environment Facilities." For example, workstation 301 may be configured as processor-based self-service systems having a user friendly graphical user interface with intuitive application navigation, efficiently presenting large amounts of data, supporting multi-media content (e.g., text, graphics, speech, sound, and/or images), accepting multi-media input (e.g., pointer, keyboard, barcode, scanner, voice, touch screen, magnetic strip, and/or MICR), and/or implementing biometrics (e.g., fingerprint, voice print, DNA, iris identification, and/or retina scanning). Such processor-based self-service systems are preferably utilized to provide a variety of users convenient access to input information, conduct queries, and obtain information and services.

Figure 5:
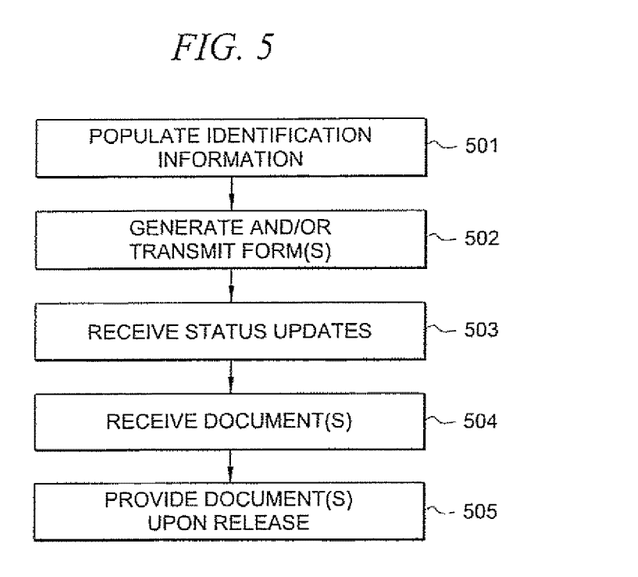
FIG. 5 depicts a flowchart of a process for facilitating the request and issuance of documentation for inmates according to one representative embodiment.

Referring to FIGS. 3 and 5, a system and method for facilitating the request and issuance of documentation for inmates according to one representative embodiment is depicted. An inmate may use one or more of workstations 301 to access a link to his or her personal electronic dossier and/or to execute secure software applications that facilitate the request of official documentation such as birth certificate, social security card, identification card, driver's license, passport, etc. In one embodiment, the documentation application may offer a package of documents to the participant. Different packages may be offered to different participants based upon their anticipated needs such as, for example, the place where they intend to move to upon release (e.g., different driver's licenses in different states), their employment objectives, or the like. In step 501, the participant may enter identification information into a workstation and the information may be stored in database 303. As part of step 501, workstation may acquire a picture of the participant or some other biometric feature (e.g., thumbprint, etc.) to be used in connection with applicable document requests (e.g., photo identification card, passport, etc.). In step 502, a secure application may use the information provided to automatically generate forms that are electronically transmitted (e.g., e-mail) or otherwise submitted (e.g., snail mail) to the appropriate governmental agency or issuing authority (e.g., U.S. Social Security Administration, a state's Department of Transportation, etc.). Alternatively, the participant may directly access the pertinent electronic forms from one of workstations 301. At least some fields of each form may be automatically filled out based upon information previously stored in the personal inmate database or in another database accessible by the secure application. Examples of other databases that may interact with the present system are described in the above referenced patent applications entitled "Information Management and Movement System and Method" and "Systems and Methods for Acquiring, Accessing, and Analyzing Investigative Information." In one embodiment, although the identification information may be acquired at any time during the period of incarceration, the time of transmission is calculated depending upon the participant's expected length of incarceration (or date of release), the need of potential employers, the expiration period of the requested document, the expected issue time, etc.

In one embodiment, the governmental authority may send periodic status updates—i.e., received, pending, accepted, issued, etc.—to the requesting inmate facility in step 503. In step 504, the facility receives the requested documents on behalf of the participants, and in step 505 the facility provides the documents to participants upon release. In one embodiment, participants and/or authorities may access the secure application or dossier to determine the status of document requests. Additionally, third parties (e.g., potential lender or employer using system 304) may also have access to at least portions of the personal dossier to perform status checks.

The methods and systems shown above with respect to FIGS. 3 and 5 provide substantial advantages. Unfortunately, inmates often lack the ability to follow the necessary procedures for obtaining identification documents on their own. Without proper identification, it would virtually impossible for the former inmate find employment, find housing, open a bank account, etc. However, using the documentation services discussed herein, participating inmates may leave the inmate facility already in possession of basic documents that are necessary in every day life, thus increasing their chances of rehabilitation. In addition, by gathering all of the inmates' identification information in personal dossiers, law enforcement may now have access to a centralized database that includes valuable identification information needed in future criminal investigations.

Figure 6:
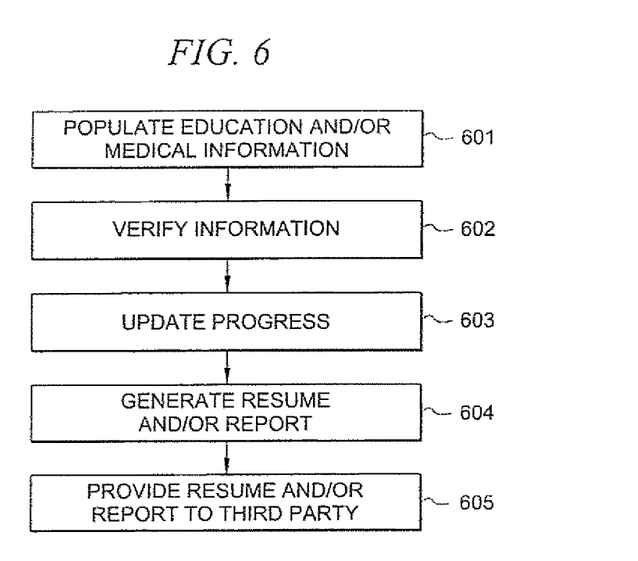
FIG. 6 depicts a flowchart of a process for facilitating gathering of education and/or medical information of inmates according to one representative embodiment.

Turning now to FIGS. 3 and 6, a system and method for facilitating the gathering of education and/or medical information of inmates according to one representative embodiment is depicted. A participant may use one or more of workstations 301 to enter his or her educational information into his or her personal inmate dossier or secure application in step 601. This information may be optionally verified by an inmate facility officer in step 602, for example, by directly contacting the schools allegedly attended or other sources. Additionally or alternatively, the education application may access a school system's electronic records and obtain the necessary information automatically. Furthermore, the officer and/or participant may continuously update the participant's progress during incarceration in step 603. In step 604, the education application may generate a participant's resume, and the resume may be made available to a third party (e.g., potential employer) in step 605. For example, the application may generate different resumes highlighting different credentials and achievements depending upon the particular type of job being sought, and may selectively provide an appropriate resume to a potential employer that best matches the requirements of that job. As such, the education application provides opportunities to inmates whom may not have the discipline or the ability to provide education information required by potential employers. Moreover, the optional verification and automatic data collection features associated with the education application may be important to employers who would otherwise have to assess uncorroborated information provided by the inmates.

Using the systems and methods described herein, employers may have access to educational information from a trusted source. When a potential employer uses system 304 to inquire into a participant's level of education, degrees and certifications awarded, special training, progress in ongoing programs, etc., the participant's resume and/or transcripts may be provided. In additional to educational information, a participant's medical records may be similarly stored in the dossier and may be accessible to third parties. Medical records may include, for example, existing and previous medical conditions, as well as the status of any counseling or treatment sought by the participant during incarceration. Where laws and/or government regulations prevent disclosure of medical records absent consent, the participant may be asked to authorize partial or full disclosure of such records. The participant's consent is thus recorded in his or her dossier. For example, the participant may authorize only the disclosure of the successful completion of a drug rehabilitation program, results of drug tests subsequently performed, or other specific data.

The education and/or medical applications described above may also provide valuable information to participants. For example, the medical application may indicate which medical exams or rehabilitation programs the participant should complete before release so as to increase his or her chances to obtain a particular type of job (e.g., whether drug tests are required, etc.). Similarly, the education application may advise the participant of education opportunities (i.e., types of classes or programs that are available) selected to match the participant's anticipated need upon release (e.g., to increase their changes of obtaining employment). For example, a basic re-entry training course may preferably be provided to participants. The course may include instruction on how to perform everyday tasks such as basic automobile care, shopping, cooking, emergency procedures, etc. Information may also be provided about different forms of government aid (e.g., welfare benefits, food stamps, etc.) that may be available to them. Additionally or alternatively, other programs such as, for instance, General Educational Development (GED), English as a Second Language (ESL), vocational classes (e.g. welding, cooking, etc.), college-level courses, self-study programs (including online classes), and the like, may be offered. In one embodiment, the education program provides a curriculum specifically designed for individual participants based upon their prior education and future plans (e.g., where they will live, what type of jobs are available in that area, what type of job they prefer, etc.). In another embodiment, the education application may also provide information and aid the participant in applying for college admission or the like (upon release and/or during incarceration).

Figure 7:
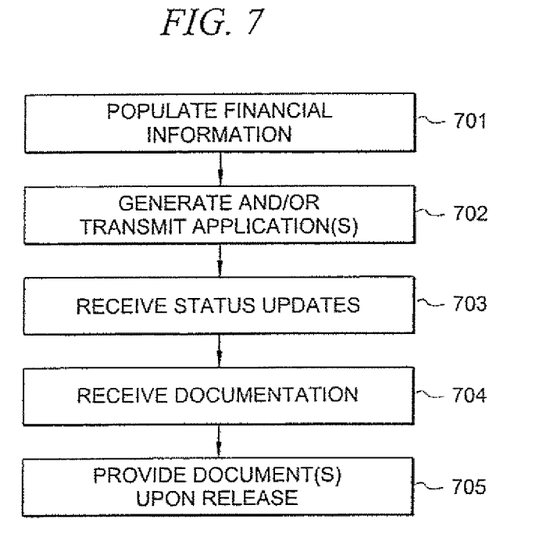
FIG. 7 depicts a flowchart of a process for facilitating the establishment of financial accounts for inmates according to one representative embodiment.

Referring to FIGS. 3 and 7 a system and method for facilitating the establishment of financial accounts for inmates according to one representative embodiment is depicted. A participant may use one or more of workstations 301 to fill out forms necessary to open accounts with financial institutions in step 701. Similarly as discussed above with respect to identification documentation, financial applications or forms may be automatically generated based upon the information provided, or the participant may access electronic forms directly. Furthermore, form fields may be automatically completed based upon information previously stored in the personal inmate database or in another database accessible by the financial application. In step 702, completed forms are transmitted to financial institutions, preferably electronically. In step 703, the processing institutions may provide periodic status updates to the facility. Once an account is successfully opened, the corresponding account documentation (e.g., checkbooks, statements, cards, etc.) is sent to the facility in step 704 and then it is provided to the participant upon release in step 705.

In one embodiment, the financial application may provide advice and information to participants with respect to which accounts to open and/or maintain depending upon, for example, the participant's level of education, financial situation, and/or anticipated need upon release. Examples of accounts that may be opened using the systems and methods described herein include checking, savings, IRA, 401k, brokerage, credit cards, and loans, among others. In another embodiment, a participant first opens an inmate account which allows the participant to pay for telephone calls and purchase commissary items at the inmate facility. Depending upon the participant's success in operating the account responsibly while incarcerated, the opportunity to obtain financial accounts such as the ones described herein may then be provided. Workstation 301 may also periodically obtain the participant's credit scores from one or more credit agencies and store those scores in the inmate's personal dossier. The advantages for participants in having financial accounts set up before release are numerous. For example, checking accounts may be required or preferred by employers when paying the participant's salary. Moreover, having financial accounts gives the participant an opportunity to create or improve his or her credit history.

Figure 8:
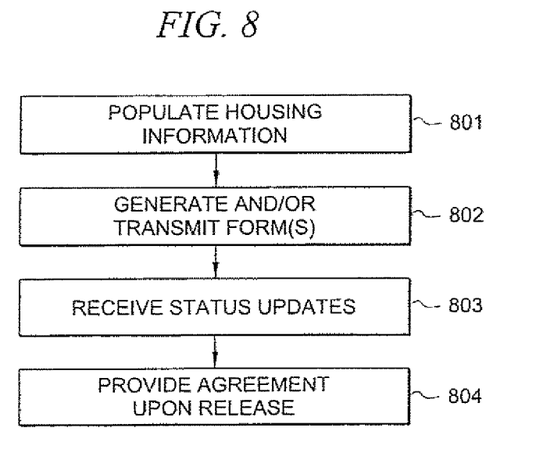
FIG. 8 depicts a flowchart of a process for facilitating housing applications for inmates according to one representative embodiment.

Referring to FIGS. 3 and 8, a system and method for facilitating housing applications for inmates according to one representative embodiment is depicted. In step 801, a participant may use one or more of workstations 301 to fill out forms necessary to apply for housing, for example, with the U.S. Department of Housing and Urban Development (HUD). Additionally or alternatively, form fields may be automatically completed based upon information previously stored in the personal inmate database or in another database accessible by the housing application. Accordingly, HUD forms may be automatically generated based upon the information provided and/or the participant may access electronic forms directly. In step 702, completed forms are transmitted to HUD, preferably electronically, and status updates may be optionally received in step 803. Preferably, the participant is provided with a lease agreement or the like in step 804. Although most inmates indicate their intent to live with family members or friends upon release, inmates that are most serious about their rehabilitation efforts often express a desire to make their own apartment or housing arrangements. In one embodiment, the housing application provides advice and information to participants that suggests where they should live based upon, for example, the types of jobs they intend to pursue, the proximity of family members and educational opportunities that match the participants employment objectives, the level of criminality in the area, etc.

The system depicted in FIG. 3 may also be used to provide a pre-defined service or application that enables participants to develop and maintain social connections and interactions. The present inventors have recognized that the more social contact an inmate has with family and friends while incarcerated, the less likely he or she will be to recidivate. Therefore, a suite of applications may be provided to participants including, for example, secure instant mail, call messaging, etc., which allows participants to maintain contact with the outside world in a controlled and safe manner. Examples of some applications and systems that may be used to provide the pre-defined service or application of the present invention are described in the above referenced patent applications entitled "System and Method for Providing Communication Services and Intervening When Necessary to Provide Service," "Systems and Methods for message Delivery in a Controlled Environment Facility," "Information Dissemination Systems and Methods for Use in a Controlled Environment Facility." While allowing the inmate to maintain social interactions, this system may also aid in criminal investigations by storing records of communication exchanges between inmates and other parties.

In one embodiment of the present invention, some or all of aforementioned pre-defined services or applications may be provided as a single application. Further, each service may also be provided as a step of a rehabilitation program. For example when an inmate is incarcerated, the first step in the program may be obtaining identification documents. Upon completion of this first step, the next step may be education. Following and/or during the execution of the education step, the participant may then be allowed to use financial services, employment services, and then housing. In this manner, later steps may benefit from information collected in earlier steps. For example, a potential employer during an employment step may desire to have the participant's information obtained in an earlier documentation step in order to process a job application. Furthermore, depending upon the participant and/or the type of inmate facility, these steps may be presented in a different order, with more or less flexibility as needed to facilitate rehabilitation and reduce recidivism.

As an incentive for participating in the rehabilitation program, certain benefits may be offered to inmates. For example, once a participant has completed certain steps in the program, free or reduced rate phone calls and/or extra exercise time may be allowed. In addition, when coupled with good behavior during incarceration, completion of every step in the program may lead to an early parole hearing, early release, or the like.

Figure 9:
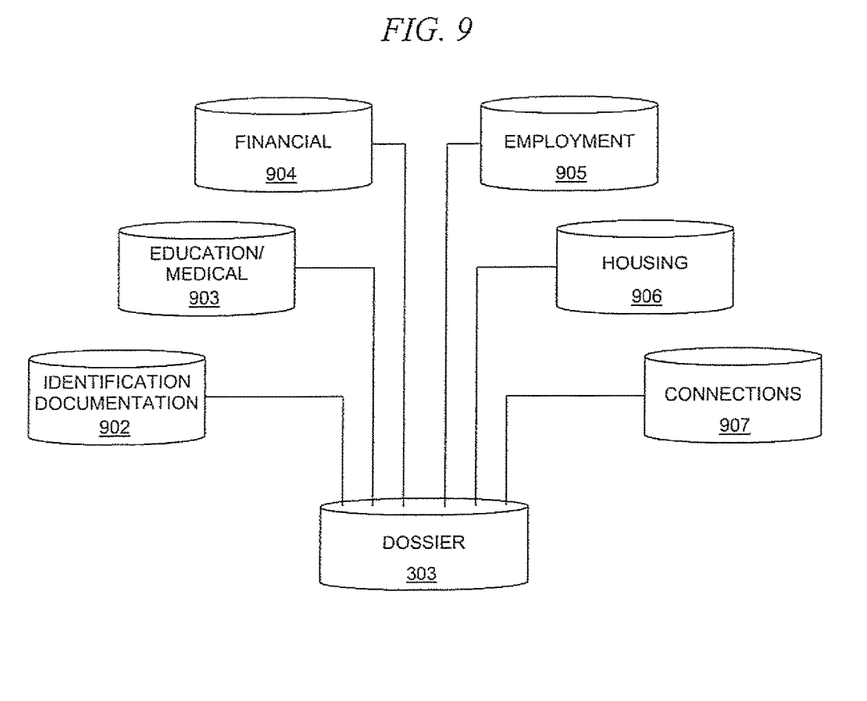
FIG. 9 depicts a block diagram of a personal inmate dossier according to one representative embodiment.

Referring to FIGS. 3 and 9, a block diagram of a personal inmate dossier according to one representative embodiment is depicted. Dossier 901 may be an encrypted or otherwise protected element of participant database 303. Dossier 901 comprises several pieces of information described herein, including identification documentation 902, education/medical 903, financial 904, employment 905, housing 906, and social connections 907. Preferably, dossier 901 is accessible by participating inmates in possession of a correct combination of username and password. To prevent fraud, in one embodiment some or all of the information entered into the dossier (at least) during incarceration may be accessible in a read-only form.

Further, different access rights may be provided to other parties depending upon the type of information sought and/or any authorization provided by the participant.

For example, with respect to financial information, the participant may have full access to his or her accounts, including account numbers, transactions, balances, etc. A potential employer without special authorization may only have access to information that reflects the existence of those accounts. Meanwhile, an inmate facility officer may have access to the account in order to determine an available balance. Similarly, the participant's social security number itself may not be shared with third parties. However, the existence of the number may be communicated to employers or the like.

Upon release from the inmate facility, some or all of the elements of dossier 901 may be printed or otherwise provided to the participant. Preferably, dossier 901 is provided in a binder with original identification information, copies of bank account documents, lease agreements, employment contracts, etc. In addition, an electronic copy of dossier 901 may be provided to the participant at an electronic address (e.g., uniform resource locator) that may be later accessed by the participant in possession of the correct combination of username, password, PIN number, and/or other personal identification. In this manner, the participant may manage or update their account, etc.

Although some embodiments of the present invention employ a printed card to facilitate communication of employment information, other mechanisms may be employed. For example, suitable information may be encoded on a CD ROM. The CD ROM may include information relevant to the employment of a program participant and information related to the tax-credit potential of the participant. The CD ROM may contain a file or files that "hyperlink" to a suitable website for retrieval of such information for presentation to an employer. The CD ROM may include a program that prompts an employer for information relevant to complete the regulatory process. Additionally or alternatively, the CD ROM may include a program that interfaces with an employer's payroll system to retrieve the relevant information. The relevant information may be autonomously communicated to tax processing system 308. Alternatively, the program may autonomously generate the forms from the retrieved information and suitable data may be communicated to tax processing system 308 to facilitating billing of the employer. Furthermore, if desired, the CD ROM may possess functionality that links to participant database 303 if desired. Other suitable computer readable media may be similarly employed such as "smart cards," USB memory drives, and/or the like. Accordingly, the term "card" is intended to encompass any suitable medium or media (such as printed media, electronic media, magnetic media, optical media, etc.) that can be used to readily communicate employment-related information.

With respect to employment, some representative embodiments may provide a number of advantages. For example, representative embodiments enable employers of small numbers of employees to obtain tax-credits in an efficient manner. Specifically, because applications for relatively large numbers of participants can be processed using a single tax-credit system, the cost of maintaining the tax-credit system per participant is relatively low.

Accordingly, the marginal profit (i.e., the additional profit gained per additional inmate) gained through completing a single tax-credit application is sufficiently higher than the marginal cost to warrant marketing these services to small businesses. Moreover, small businesses are provided a greater incentive to employ participants. In addition to obtaining the tax-credits without expending additional resources, small businesses may obtain work history and other relevant information to facilitate their hiring decisions. Specifically, employers can access the employment database using the employment cards thereby lowering their cost of human resources activities. Additionally, program participants may receive benefits. The probability of an employer giving a participant consideration during the hiring process is increased by using the employment cards. The increased probability of program participants securing employment provides societal benefits such as reduced costs associated with underemployment.

Other embodiments of the present invention present benefits to parole officers because the information gathered during preparation of personal dossiers may be used to determine, for example, the participants incarceration history, educational achievements, and the like. Similarly, probation officers also benefit from having access to this information in determining where participants are currently residing, whether they are working, who they are associated with, etc. In addition, state and federal jail or prison boards may use personal dossiers to create the reporting and the census for jail statistics. These statistics may be linked with types of crime so that, for example, it facilitates the tracking of sex offenders upon release (i.e., their residence, place of employment, etc.).

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for facilitating request and issuance of documentation for an inmate comprising:
    creating, by an inmate employment facilitation system, during an inmate's period of incarceration a personal electronic dossier comprising information relevant to said inmate's identification, education, and employment;
    configuring an inmate self-service terminal to communicate with the inmate employment facilitation system and to provide the inmate access to the inmate's personal electronic dossier and for the inmate to input information, conduct queries, and obtain information and services;
    identifying, by the inmate employment facilitation system, one or more official documents required by the inmate upon release, the one or more official documents corresponding to documentation of the inmate's identification, education, employment, or a combination thereof;
    transmitting, by the inmate employment facilitation system, a request for issuance of the one or more official documents to a government agency responsible for issuing the one or more official documents, the inmate employment facilitation system timing transmission of the request for issuance based upon an expected issue time of said one or more official documents and an expected date of release of said inmate, wherein the request for issuance includes at least a portion of information of said personal electronic dossier;
    receiving, before the expected date of release of said inmate, said one or more official documents in response to said transmitted request for issuance;
    creating, at direction of the inmate self-service terminal, a physical package comprising a copy or original of the one or more official documents; and
    providing the physical package to the inmate upon release.

2. The method of claim 1, further comprising advising said inmate about which of the one or more official documents that said inmate requires upon release to match said inmate's anticipated needs upon release.

3. The method of claim 1, further comprising periodically receiving a status update from said government agency with respect to said transmitted request for issuance.

4. The method of claim 1, wherein timing transmission of the request for issuance is further based upon a time of expiration of said one or more official documents.

5. The method of claim 1, further comprising:
    acquiring, during said inmate's period of incarceration, information relevant to said inmate's education; and
    storing said information relevant to said inmate's education in said personal electronic dossier.

6. The method of claim 5, further comprising advising said inmate of an education opportunity selected to match said inmate's anticipated needs upon release.

7. The method of claim 5, further comprising verifying said information relevant to said inmate's education with an education information source.

8. The method of claim 1, further comprising periodically updating said information relevant to said inmate's education throughout the inmate's period of incarceration.

9. The method of claim 1, further comprising:
receiving, during said inmate's period of incarceration, information relevant to said inmate's medical history; and
storing said information relevant to said inmate's medical history in said personal electronic dossier.

10. The method of claim 9, further comprising advising said inmate of medical exams selected to match said inmate's anticipated needs upon release.

11. The method of claim 1, further comprising:
receiving, during said inmate's period of incarceration, information relevant to said inmate's potential employment;
storing said information relevant to said inmate's potential employment in said personal electronic dossier.

12. The method of claim 11, further comprising advising said inmate of employment opportunities selected to match said inmate's anticipated needs upon release.

13. The method of claim 11, further comprising:
making at least some of the information stored in said personal electronic dossier available to a potential employer for facilitating a hiring decision with respect to said inmate.

14. The method of claim 1, further comprising:
gathering financial information from said inmate during said inmate's period of incarceration;
transmitting a request for a financial account document to a document issuer, wherein said request for the financial account document comprises said gathered financial information; and
receiving the financial account document in response to said transmitted request for the financial account document.

15. The method of claim 14, further comprising providing at least a portion of said financial information to a potential employer upon request.

16. The method of claim 14, further comprising advising said inmate of a financial account selected to match said participating inmate's anticipated needs upon release.

17. The method of claim 14, further comprising:
generating a financial application form using said gathered financial information; and
receiving a status update with respect to said financial application.

18. The method of claim 14, further comprising advising said inmate of a housing opportunity selected to match said inmate's anticipated needs upon release.

19. The method of claim 1, further comprising providing said inmate with read-only access to a first portion of said personal electronic dossier after release.

20. The method of claim 19, wherein the inmate is allowed to update a second portion of said personal electronic dossier after release.

21. The method of claim 1, further comprising providing a third party with access to at least a portion of said personal electronic dossier.

22. The method of claim 21, wherein said third party is selected from the group consisting of: a potential employer, a parole board member, a probation officer, a law enforcement officer, and a criminal investigator.

23. A method for facilitating employment of inmates comprising:
implementing biometrics, by an inmate self-service terminal, to identify a particular inmate, the self-service terminal configured to communicate with an electronic employment database;
providing, by the inmate self-service terminal, said identified inmate a link for populating the electronic employment database with information relevant to employment of said identified inmate, the information entered into the electronic employment database prior to release of said identified inmate from a correctional institution and prior to a meeting between said identified inmate and a potential employer;
providing said identified inmate an employment card upon release from the correctional institution and prior to the meeting between said identified inmate and the potential employer, wherein said employment card contains a description of a tax-credit available for employment of said identified inmate, an identifier of a contact source of an inmate employment facilitation tax processing system, and a database key to perform a database look-up in said electronic employment database to obtain at least some of said information relevant to employment of said identified inmate;
making said at least some of said information relevant to employment of said identified inmate in said electronic employment database available through said contact source, using the database key, to facilitate a hiring decision related to said identified inmate;
receiving, at said inmate employment facilitation tax processing system, tax information from a hiring employer related to employment of said identified inmate; and
applying, by said inmate employment facilitation tax processing system, for said tax-credit based on said received tax information.

24. The method of claim 23 wherein said information in said electronic employment database is made available to a temporary employment agency.

25. The method of claim 24 further comprising:
receiving information by said temporary employment agency from one or more potential employers related to one or more employment opportunities of said one or more potential employers available for one or more inmates released from one or more correctional institutions.

26. The method of claim 25 wherein said receiving said tax information comprises:
receiving said tax information from said temporary employment agency by said inmate employment facilitation tax processing system.

27. The method of claim 24 wherein said temporary employment agency selects one or more candidates from released one or more inmates for one or more employment opportunities of one or more potential employers.

28. The method of claim 23 wherein said identifier of said contact source is a uniform resource locator (URL).

29. The method of claim 28 further comprising:
providing a website accessible through said URL that enables a work history of said identified inmate to be reviewed.

30. The method of claim 28 further comprising:
providing a website accessible through said URL that enables a criminal background history to be reviewed.

31. The method of claim 28 further comprising:
providing a website accessible through said URL to enable one or more employers to report information related to employment of one or more inmates.

32. The method of claim 23 further comprising:
providing an automated application to enable one or more inmates to follow employment opportunities.

33. The method of claim 32 wherein said automated application is a website that details employment opportunities available for application by one or more inmates.

34. The method of claim 32 wherein said automated application is an interactive voice response (IVR) system that details employment opportunities for application by one or more inmates.

35. The method of claim 32 wherein said automated application enables one or more inmates to apply for said employment opportunities.

36. The method of claim 32 wherein said automated application determines a respective geographical region during interaction with an inmate to select available employment opportunities for presentation to said inmate.

37. A method for facilitating employment of inmate job applicants, comprising:
implementing biometrics, by an inmate self-service terminal, to identify a particular inmate job applicant, the self-service terminal configured to communicate with a database;
providing, via the inmate self-service terminal, said inmate job applicant a link for populating the database with employment information of said inmate job applicant, the employment information entered in the database prior to a meeting between said inmate job applicant and a potential employer;
providing said inmate job applicant with an employment card that includes a job applicant identifier and an identifier of a resource that enables said potential employer to access said database, wherein said employment card informs said potential employer of a professional service, by an inmate employment facilitation tax processing system, that fulfills requirements related to employment of said inmate job applicant for said potential employer, the employment card provided to said inmate job applicant prior to the meeting between the inmate job applicant and the potential employer;
receiving, by an inmate employment facilitation system, a query from the potential employer through said resource to access said database using said job applicant identifier;
providing, by the inmate employment facilitation system, said employment information in response to said received query;
receiving, at said inmate employment facilitation tax processing system, tax information from a hiring employer related to employment of said inmate job applicant; and
completing, by said inmate employment facilitation tax processing system, a tax-credit regulatory requirement associated with employment of said inmate job applicant and based on said tax information.

38. The method of claim 37 wherein said receiving said tax information from said hiring employer comprises:
receiving hours-worked by said inmate job applicant for said hiring employer via an automated application.

39. The method of claim 37 wherein said resource is a webserver and said identifier of said resource is an uniform resource identifier (URL).

40. The method of claim 37 wherein said resource is an interactive voice response (IVR) system and said identifier of said resource is a telephone number.

41. The method of claim 37 wherein said populating said database comprises:
populating said database with employment history information of said inmate job applicant.

42. The method of claim 37 wherein said populating said database comprises:
populating said database with marketable skill information of said inmate job applicant.

43. The method of claim 37 wherein said populating said database comprises:
populating said database with information related to completion of vocational courses by said inmate job applicant.

44. The method of claim 38 wherein said automated application is a webserver.

45. The method of claim 37 wherein said professional service verifies prior employment histories of job applicants.

46. The method of claim 37 wherein said professional service verifies references of job applicants.

47. The method of claim 37 wherein said professional service verifies legal requirements associated with employment of said job applicants.

48. An inmate employment facilitation system, comprising:
a database populated with employment history information associated with an inmate, the employment information comprising information selected from the group consisting of the inmate's prior employers, marketable skills, educational background, professional licenses, certifications, and reference information;
a processor-based inmate self-service terminal implementing biometrics to identify the inmate and configured to provide the inmate a link to a personal electronic dossier comprising the employment history information associated with the inmate, the inmate self-service terminal configured for input of at least a portion of the employment history information associated with the inmate;
an inmate employment facilitation system server coupled to the database, the server autonomously generating a resume for the inmate, based at least in part on the employment history information associated with the inmate; and
a website interface coupled to the server, the website interface providing employer access to the resume, the website adapted to receive employer queries concerning inmates and to provide information to the employers in response to the queries.

* * * * *